United States Patent
Arastafar et al.

(10) Patent No.: US 9,788,168 B2
(45) Date of Patent: *Oct. 10, 2017

(54) GENERATING SPATIAL MODELS USING CROWDSOURCING

(71) Applicant: RingCentral, Inc., Belmont, CA (US)

(72) Inventors: Martin Arastafar, Redwood City, CA (US); Patrice Khawam, San Francisco, CA (US); Christopher van Rensburg, Foster City, CA (US)

(73) Assignee: RINGCENTRAL, INC., Belmont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/985,184

(22) Filed: Dec. 30, 2015

(65) Prior Publication Data

US 2016/0227379 A1 Aug. 4, 2016

Related U.S. Application Data

(63) Continuation of application No. 14/609,226, filed on Jan. 29, 2015, now Pat. No. 9,264,861.

(51) Int. Cl.
*H04W 24/00* (2009.01)
*H04W 4/04* (2009.01)
(Continued)

(52) U.S. Cl.
CPC ........... *H04W 4/043* (2013.01); *H04L 5/0053* (2013.01); *H04W 24/08* (2013.01)

(58) Field of Classification Search
CPC .................................................... H04W 4/043
See application file for complete search history.

(56) References Cited

U.S. PATENT DOCUMENTS 6,898,559 B2   5/2005  Saitta
9,264,861 B1 * 2/2016  Arastafar .............. H04W 4/043
(Continued)

FOREIGN PATENT DOCUMENTS

WO   WO 2014/023011   2/2014
WO   WO 2014/026338   2/2014

OTHER PUBLICATIONS

United States Office Action, U.S. Appl. No. 14/609,226, dated Jun. 29, 2015, 14 pages.
(Continued)

*Primary Examiner* — Justin Lee
(74) *Attorney, Agent, or Firm* — Fenwick & West LLP

(57) ABSTRACT

Contextual spatial models for indoor and outdoor structures are created from a plurality of devices using crowdsourcing. A method for creating a contextual spatial model for a premises includes receiving location information and contextual information from a plurality of devices. For each of the plurality of devices, the method receives location information of the device's location, and contextual information related to at least one of the device and a user associated with the device when the device is at the location. The method then determines a designation for each subject location within the premises by applying the received contextual information associated with the subject location to a location model (e.g., rules-based model or a machine learning model).

19 Claims, 4 Drawing Sheets

(51) Int. Cl.
*H04W 24/08* (2009.01)
*H04L 5/00* (2006.01)

(56) References Cited

U.S. PATENT DOCUMENTS

| | | | |
|---|---|---|---|
| 2004/0192341 A1* | 9/2004 | Wang | H04W 28/26 455/456.1 |
| 2008/0316970 A1* | 12/2008 | Choi | H04W 36/0066 370/331 |
| 2011/0137996 A1 | 6/2011 | Stewart | |
| 2013/0040661 A1* | 2/2013 | Grube | H04W 4/22 455/456.3 |
| 2014/0141803 A1 | 5/2014 | Marti et al. | |
| 2014/0278086 A1 | 9/2014 | San Filippo et al. | |
| 2015/0208204 A1* | 7/2015 | Niemoeller | H04W 4/028 455/457 |

OTHER PUBLICATIONS

United States Office Action, U.S. Appl. No. 14/609,226, dated Mar. 20, 2015, 13 pages.
United States Advisory Action, U.S. Appl. No. 14/609,226, dated Sep. 14, 2015, 3 pages.

* cited by examiner

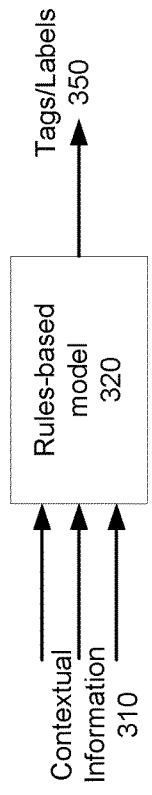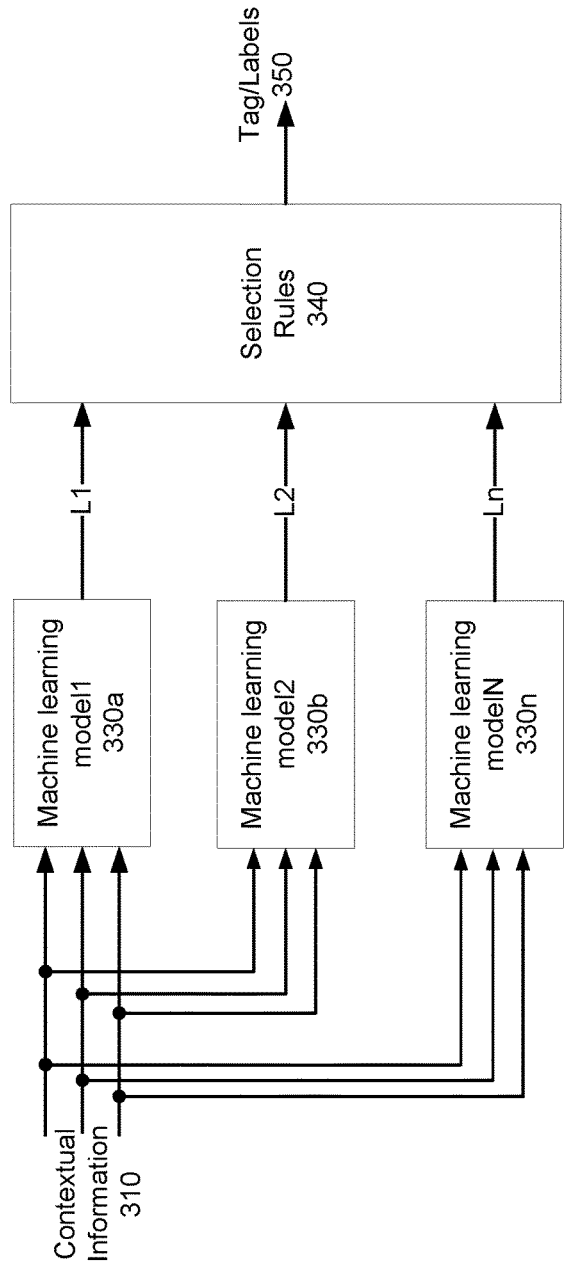

GENERATING SPATIAL MODELS USING CROWDSOURCING

CROSS REFERENCE TO RELATED APPLICATION

This application is a continuation of U.S. patent application Ser. No. 14/609,226, filed Jan. 29, 2015, which is incorporated by reference in its entirety.

BACKGROUND

This disclosure generally relates to spatial models, and specifically to generating spatial models using crowdsourcing to manage or allocate resources such as communications services.

Spatial models are representations of physical features of various structures or locations, such as roadways, buildings, stadiums, and the like. A spatial model includes spatial or geographical data about the structure it represents. Spatial models are extensively used in creating spatial maps, either for indoor structures such as an office floor of a building or for outdoor structures such as a football stadium. Existing techniques to create spatial models include aerial photography and satellite imagery. But these existing techniques require significant manual efforts to create reliable and accurate spatial models, which is not scalable for generating spatial models for a large number of locations.

BRIEF DESCRIPTION OF THE DRAWINGS

FIG. 3a is a block diagram illustrating a rules-based model for generating the contextual spatial models of FIG. 2, according to an example embodiment.

FIG. 3b is a block diagram illustrating a machine learning model for generating the contextual spatial models of FIG. 2, according to an example embodiment.

Figure 1:
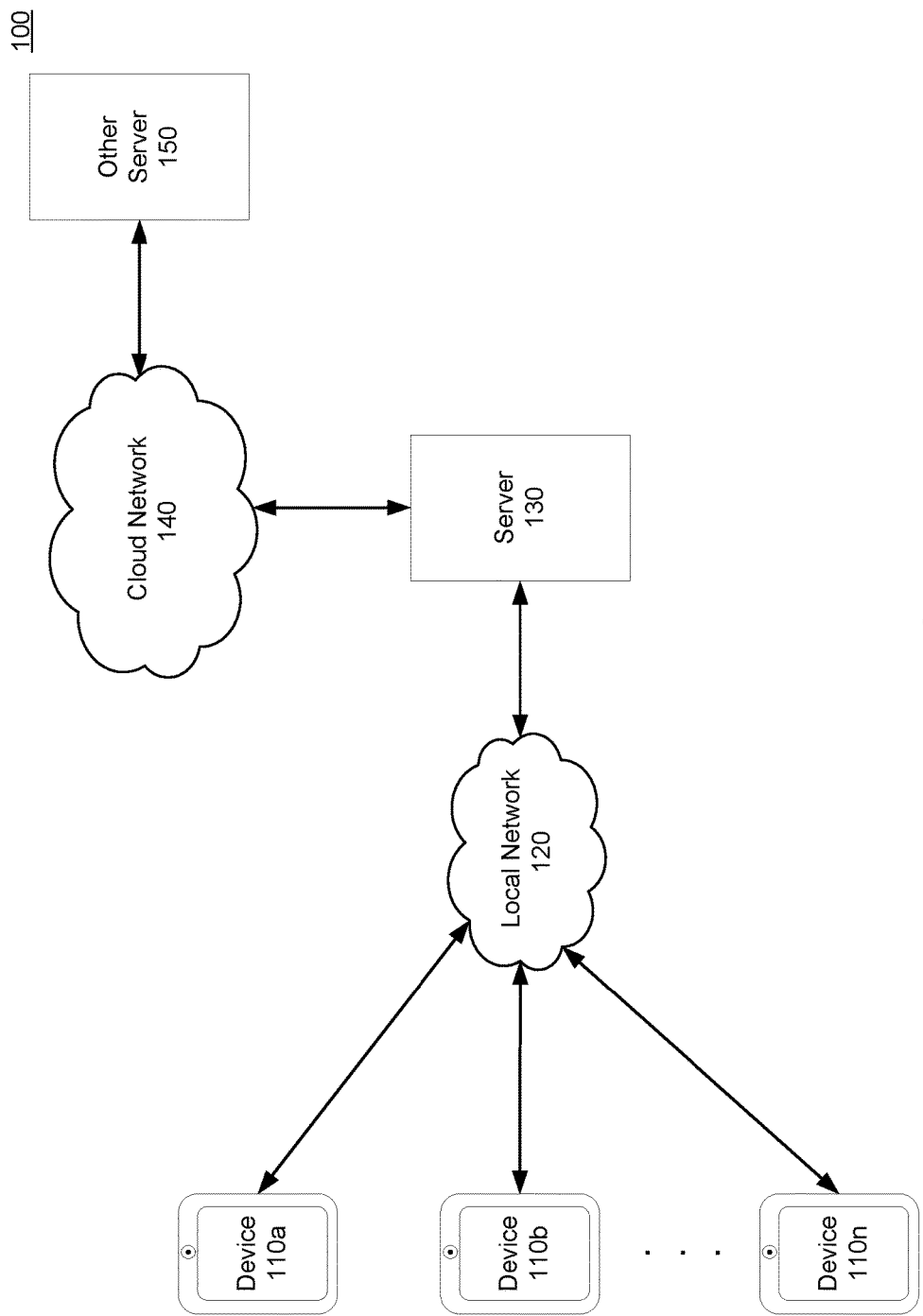
FIG. 1 is a block diagram of a system generating contextual spatial models using crowdsourcing, according to an example embodiment of the present disclosure.

The figures depict various example embodiments of the present disclosure for purposes of illustration only. One skilled in the art will readily recognize from the following discussion that other example embodiments based on alternative structures and methods may be implemented without departing from the principles of the disclosure.

DETAILED DESCRIPTION

Spatial models are used for mapping physical features such as land topography, roads, buildings, and waterways. Conventional techniques to create spatial models include aerial photography and satellite imagery, which are expensive and require specialized equipment. Additionally, conventional techniques are not well suited to create spatial models for indoor structures like indoor garages, office buildings, and indoor stadiums.

Contextual spatial models are created using crowdsourcing from a plurality of devices. The created spatial models are used to monitor the usage and control the distribution of telephony resources associated with the mapped areas. For example, users behaviors in certain locations (e.g. location of conference rooms based on calendar information and high bandwidth usage) are monitored to better allocate communications services (e.g. provide higher bandwidth at conference room to ensure QoS for video conferencing) at that location in real-time.

The contextual spatial models are created with a sufficient accuracy by monitoring users' patterns of movement and complementing that location information with additional information such as user inputs from calendar events, messages, and other contextual information about a user's status and/or activities associated with the user's location within the structure. The method of creating contextual spatial model for premises includes receiving location information and contextual information from a plurality of devices. For each of the plurality of devices, the method receives location information of the device's location and contextual information related to at least one of the device and a user associated with the device when the device is at the location. The method then generates a designation for each subject location within the premises by applying the received contextual information associated with the subject location to a location model (e.g., a rules-based model or a machine learning model).

An example advantage of crowdsourced contextual spatial models is an ability to understand the spaces being mapped in terms of how they relate to communication behavior and usage patterns. Another example advantage is an ability to create and update in real-time dynamic contextual spatial models that can be used to manage the distribution of telephony resources more efficiently in real-time. Another example advantage of this method is applicable to different premises with varying capacities such as small indoor premises to a large indoor premises without significant changes to the system. Yet another example advantage of creating contextual spatial models using crowdsourcing includes the low cost nature compared to the conventional techniques using either aerial photography or satellite imagery that require specialized equipment.

FIG. 1 shows a high-level block diagram of a system describing contextual spatial models using crowdsourcing, according to an example embodiment of the present disclosure. An example contextual spatial model of an indoor building is a spatial map or layout of the building (e.g., map 400 of FIG. 4). The system shown in FIG. 1 includes a plurality of devices 110a through 110n that are used by a plurality of users. FIG. 1 also shows a server 130 and a local network 120 that server 130 uses to interact with the plurality of devices 110a-n. In one example embodiment, server 130 is not locally coupled to the devices 110 a-n and is remotely coupled to the devices 110a-n through another network such as other server 150. FIG. 1 further shows other server 150 and a cloud network 140 that other server 150 uses to interact with server 130 and with the plurality of devices 110a-n.

Each device of the one or more plurality of devices 110a-n is an electronic device, such as cell phone, smart phone, desktop phone with a display, audio and/or video conferencing device, tablet, computer, gaming console, home automation device, security cameras, embedded computing devices with unique identifiers and interconnected in an Internet of Things network, unmanned aerial vehicles (i.e., drones), or any device that can provide location information of the device and contextual information items associated with a location of the device. Device 110a includes, among other components, a location tracker module and a memory module to store data. The location tracker module is used to track a location of the device. For example, the location tracker module can track the location using global positioning system (GPS), WiFi™-based indoor positioning, beacon technology, cellular network-based techniques (e.g., triangulation method), handset-based techniques, subscriber identity module (SIM)-based techniques in global system for mobile communications (GSM™) and universal mobile telecommunications system (UMTS™) networks. In an example embodiment, a combination of two or more of the above-listed techniques can be used to improve the accuracy of location tracking. For example, a combination of GPS and WiFi™-based indoor positioning can improve accuracy of smart phones. Alternatively, location tracker module can include a plurality of sensors that can also determine a location of the device. For example, a typical smart phone includes a proximity sensor (e.g., can enable near field communication), ambient light sensor, accelerometer, barometer, magnetometer, biometric sensors, and gyroscopic sensor, providing sensor information.

The memory module of the device stores data associated with tracking the location of the device. In an example embodiment, the memory module can also store data associated with contextual information items. The memory module can include high-speed random access memory and/or non-volatile memory, such as one or more magnetic disk storage devices, one or more optical storage devices, and/or flash memory (e.g., NAND, NOR). The memory module can store an operating system such as Darwin™, RTXC™, LINUX™, UNIX™, OS X™, WINDOWS™, ANDROID, or an embedded operating system such as VxWorks™. The operating system can include instructions for handling basic system services and for performing hardware dependent tasks. In some implementations, the operating system can be a kernel (e.g., UNIX™ kernel). The memory module can also store communication instructions to facilitate communicating with one or more additional devices, one or more computers and/or one or more servers (e.g., server 130 and other server 150).

Local network 120 allows the plurality of devices 110a-n to interact with server 130. In an example embodiment, local network 120 uses standard communications technologies and/or protocols. Thus, local network 120 can include links using technologies such as Ethernet, 802.11 standards, worldwide interoperability for microwave access (WiMAX), WiFi, 3G, digital subscriber line (DSL), etc. The data exchanged over local network 120 can be represented using technologies and/or formats including the hypertext markup language (HTML), the extensible markup language (XML), etc.

Server 130 is coupled to the plurality of devices 110a-n via local network 120 for receiving information associated with location of the devices and/or contextual information items associated with a location of the devices. In the presently described embodiment, server 130 operates in a client-server architecture, where server 130 serves client devices such as devices 110a-n based on any requests received from the client devices. Some of the functions that server 130 can perform include receiving, hosting, storing, and providing data associated with location of the client devices as well as contextual information items associated with the device location. For example, the server 130 can be at least one of: an email server, fax server, application server, communications server, database server, and a group of remote servers. In some example embodiments, server 130 can provide virtual private branch exchange (vPBX) services including telephony, fax, and electronic messages. In an example embodiment, server 130 manages resources such as communication resources allocated to a premises. For example, server 130 manages telephony or wireless bandwidth resources for an office building.

Cloud network 140 allows the server 130 to interact with other server 150. In an example embodiment, cloud network 140 uses the same communications technologies and/or protocols as that of local network 120 except that cloud network 140 interfaces between server 130 and other server 150, where the other server 150 can be a server whose functionality is distributed over a plurality of servers over a cloud. Each server of the plurality of servers is similar in functionality to server 130 described above. The cloud network 140 can include a communications network such the Internet. The other server 150 can store and provide the user's contextual information (e.g. calendar server 150).

In an example embodiment, the server 130 implements the tasks involved in generating and/or updating contextual spatial models using crowdsourcing. In such example scenario, the server 130 receives a request to generate and/or update contextual spatial models based on location and contextual information received from the plurality of devices 110a-n. Alternatively, the other server 150 implements the tasks involved in generating and/or updating contextual spatial models using crowdsourcing. An implementation of generating and/or updating contextual spatial models using crowdsourcing is described in detail below with reference to FIG. 2.

Figure 2:
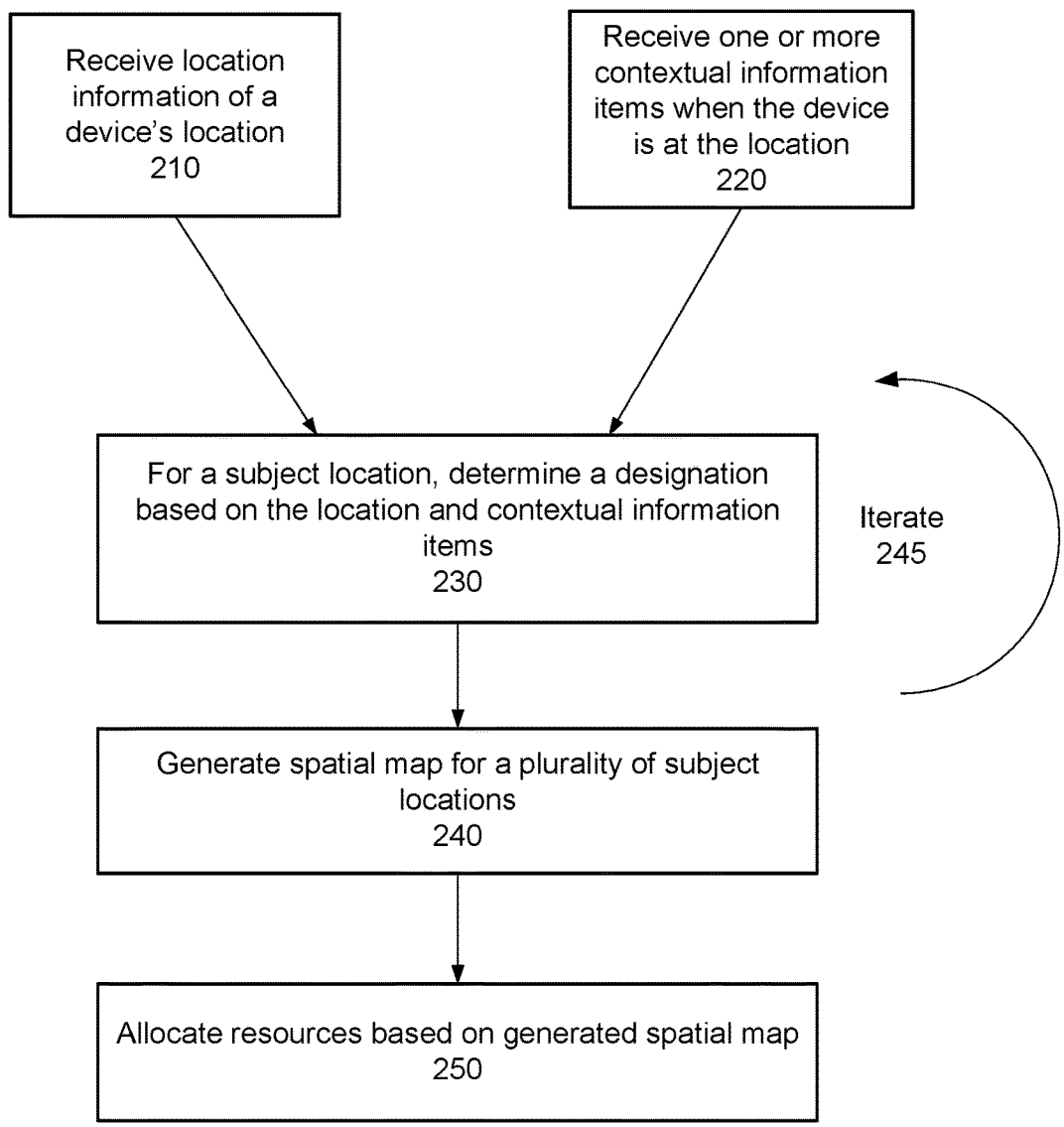
FIG. 2 is a block diagram illustrating a generation of contextual spatial models using crowdsourcing, according to an example embodiment.
Figure 4:
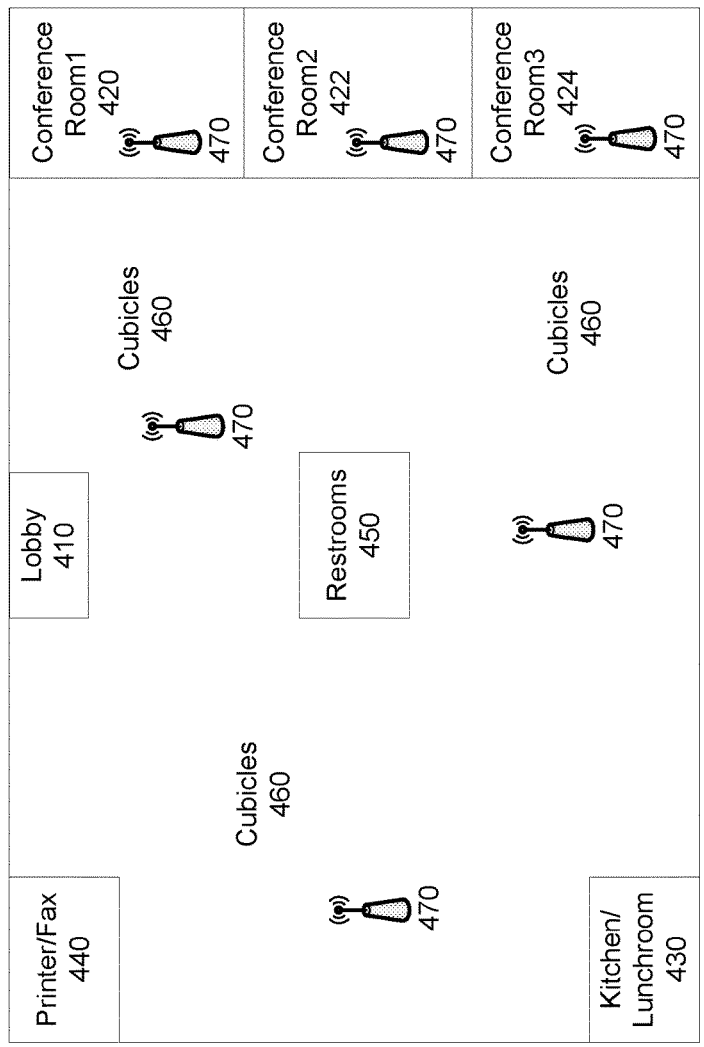
FIG. 4 is a block diagram illustrating an example contextual spatial model.

FIG. 2 is a flow chart illustrating a process of generating contextual spatial models of a premises using crowdsourcing, according to an example embodiment. FIG. 2 depicts various tasks involved in the generation and/or updating of contextual spatial models using crowdsourcing. A contextual spatial model of a premises can be created by monitoring a pattern of a user's movements (e.g., by tracking a location of a device carried by the user) and by complementing the location information with additional contextual data as described below. An example contextual spatial model 400 is illustrated in FIG. 4. The various tasks of FIG. 2 can be implemented by system 100 of FIG. 1 and specifically by a server local to the premises (e.g., server 130) or a server remote to the premises (e.g., other server 150) of system 100.

User movements can be monitored by tracking location information of a device carried by the user. The generation of contextual spatial models includes receiving location information 210 of the device's (e.g., a device of the plurality of devices 110a-n) location. The location information can be received either from an end point that tracks the location (e.g., a device of the plurality of devices 110a-n) or a server that stores such information after receiving from end points (e.g., a server 130 or other server 150). The device's location can be detected and tracked using one or more of the several techniques described above with reference to FIG. 1. Example location information can include GPS coordinates or other coordinates relative to a reference location. Alternatively, the location information can be received from a first device that has a fixed location (e.g., smart thermostat), where the first device with the fixed location is actually receiving location information from a second device (e.g, smartphone) that is an end point that tracks the location.

Any given premises will include multiple subject locations that need to be identified to create a contextual spatial model (e.g., contextual spatial model 400) for the premises. For each subject location, a particular designation (e.g., a label) for that location can be generated based on contextual information associated with the subject location. The generation of contextual spatial models further includes receiving contextual information 220 that supplements the location information 210 of the subject location. The contextual information includes a plurality of information items associated with at least one of: calendar, phone log, sensor information, electronic messages (e.g. email, instant messages, fax), and social networking applications of the at least one device.

Contextual information can also include information that indicates how users modify their communication preferences at a subject location by modifying the device settings. For example, users while at a subject location may regularly switch their phone application to vibrate rather than the regular ringtone, switch their call handling rules to direct incoming calls directly to voicemail, change their presence status to being unavailable, sending an auto-reply message in response to incoming calls/message, or predominantly use one mode of communication (such as texting) over others. The above-described contextual information as it relates to communication behavior associated with a subject location can then be used to improve the experience of communication for users associated with the subject location in the future. As an example, the system allocates telephony or wireless bandwidth resources to tune the quality of service for certain preferred mode(s) of communication on a per location basis based on the received contextual information. The contextual information can be received either from an end point (e.g., a device of the plurality of devices 110a-n) or a server (e.g., a server 130 or other server 150). The contextual information 220 that supplements the subject location's location information is related to at least one device of the plurality of devices and the user of the at least one device.

In an example scenario, a user's device receives an email notification that the user received a fax message. The system tracks the movement of the user's device after receiving the email fax notification. In this example scenario, the system combines the received contextual information (i.e., email fax notification) along with the user's device movements (i.e., location information 210) to generate a designation for the location of the user's device (i.e., subject location) in response to receiving the email fax notification.

In another example scenario, the system can map the location of a user's desk phone or desktop based software phone, based upon a process as follows. The user's location (i.e., subject location) can be known from a telephony mobile application installed on the user's device, the user already authenticated in the application, and the application reports location information associated with the user to the system. When the same user is authenticated with and is actively using their desk phone or desktop computer software phone, the phone system also reports the usage information of the desk phone or desktop software phone to the system, using a user ID that corresponds to the user ID of the subject location information provided by the mobile device application. The location that is predominantly correlated to the usage activity is interpreted to indicate the location of the desktop phone, and by this information the location can be reasonably inferred to be the user's desk location.

In yet another example scenario, the system can determine the designation of a location as being a call center. The system detects a plurality of users (by detecting devices associated with the users) at a subject location and with spatial proximity to one another. The system also receives contextual information associated with the communications of the users, each user is engaged in a kind of intensive communication activity using a communication service similar to the other users that are in proximity. Similar to the process described above with reference to determining a user's desk phone, the system them determines a designation for the subject location as a call center by extending the desk phone process for the plurality of users in proximity.

After receiving the contextual information of the subject location, the system determines a location model that is used to create contextual spatial model. The location model can be a rules-based model or a machine learning model. The rules-based model and machine learning model are described in detail below with reference to FIGS. 3a and 3b.

FIG. 3a is a block diagram illustrating a rules-based model used for generating the contextual spatial models of FIG. 2, according to an example embodiment. A rules-based model 320 comprises one or more rules that are explicitly programmed instructions for generating a designation of a subject location. For a subject location, the rules-based model 320 receives contextual information 310 associated with the subject location and generates a designation or tag 350 based on instructions associated with the one or more rules. In an example embodiment, the process of receiving contextual information and generating a designation is repeated for each unique subject location of a premises such that a complete contextual spatial model of the premises can be generated. Alternatively, the process of receiving contextual information and generating a designation is repeated for a subset of all unique subject locations of the premises.

A generalized rule of the one or more of the rules-based model includes instructions to determine whether a percentage of devices of users are detected at a subject location within a time period of the devices receiving a notification of the one or more contextual information items. An example rule to generate a "fax" designation for a subject location is when more than a percentage (e.g., 70%) of devices of users are detected to be at the subject location within a time period (e.g., 1 hour) of receiving a notification (e.g., email) of an incoming fax. Another example rule to generate a "lobby" designation for a subject location is when more than a percentage (e.g., 60%) of devices of users are detected to be at the subject location within a time period (e.g., 5 minutes) of receiving a notification (e.g., email or phone call) that an external visitor with whom a meeting is scheduled has arrived at the office.

Another example rule to generate a designation for a subject location is whether a percentage of the plurality of devices are detected at the subject location within a time period of a scheduled event. For example, a subject location can be designated as a conference room if a percentage (e.g., 90%) of devices are detected at the subject location within a time period (e.g., 15 minutes) from a start time of an event. Another example rule to generate a designation for a subject location is whether device settings of devices associated with the subject location are modified for a percentage of the devices at the subject location. Exemplary modifications for the device settings include at least one of: changing mobile phone ringtone to vibrate, changing incoming call handling rules to direct calls to voicemail directly, and sending an auto-reply message in response to incoming calls or messages. For example, when a percentage (e.g., 90%) of the devices at the subject location of an office building have their settings modified to a vibrate mode, the subject location is designated as a conference room.

Another example rule to generate a designation for a subject location is whether a percentage of the plurality of devices is engaged in predominantly work-related communication or engaged in predominantly personal communication. For example, when a percentage (e.g., 70%) of the devices at a subject location of an office building are being engaged in predominantly personal communications, the subject location is designated as a kitchen or break room. The values of percentages of devices and time periods associated with the one or more rules can be predetermined (e.g., hard-coded), determined dynamically (e.g., programmed via software), or set by a user or a network administrator.

In an example embodiment, the generated designations (e.g, labels) for each subject location can indicate a current status of the location in addition to identifying the subject location. For example, a subject location designated as a "conference room" can also include a status of the conference room such as whether the conference room is "in use" or "not in use" as part of the designation. That is, the designation can provide an indication of current demand for resources associated with the conference room. The generated designations can be dynamic such that the status portion of the designation can change in real-time as the numbers of devices of users located in the subject location changes with time. In the conference room example, the generated designation can indicate that the conference room is "in use" when the number of devices detected is above a threshold and that the conference room is "not in use" when the number of detected devices is below a threshold.

In an example embodiment, the status indication of the subject location can be used to manage resources of the premises. If the system can query a subject location with a venue ID that is associated with a scheduled meeting with a registered set of participants, and upon determination that none of registered set of participants are detected (i,e., devices associated with the participants) within the subject location within a time period, the system updates the status indication as "available" or "not in use." This determination can be acted upon in a number of ways, including in the most polite case a message sent by the system to the meeting organizer to correctly book resources for meetings for the benefit of other users and the system being able to accurately reflect resource availability.

In another example embodiment, a group of people convene an impromptu meeting in an available conference room. In such an example scenario, a detection of a bunch of devices associated with the group of people at a subject location that is already designated as a conference room can be deemed to indicate that the people are in a meeting, even though there might not be a scheduled meeting associated with the calendars of those people. In response to such a determination, a status indication of the conference room with the impromptu meeting can be updated to indicate that the conference room in in use.

Additional status indicators might include, for example, the availability of a video conferencing system at the location, such as in a conference room. A determination that a subject location has a video conferencing capability can be made by the system in the same way as determining the location of a user's desk phone, as described above. The location of a plurality of users is known by the at least one of users' devices reporting location information to the system. At the same time, the system receives contextual information from various communication channels and communication subsystems, including a sophisticated conference room video conferencing system with multiple in-room cameras, from the subject location that has such a capability. By detecting that users that are engaged in use of the video conferencing system of the subject location also located at the subject location, the location of the video conferencing system can be automatically determined, and this information can then be used to augment the designation for the conference room location so that future potential users of this location can know that the location offers this capability.

In addition to determining a status of a subject location, the spatial map can include an indication of a quality of service (QoS) of communication at the subject location. In an example scenario, users can regularly move to a particular location to improve QoS of their communications such as, communications connectivity or call quality. The system can monitor the QoS of the communications, for example, by communication client application on the user' device or by the telephony system, and can associate call quality with the subject location, and provide an indication of the QoS along with the location's designation. This QoS information can then be used to provide feedback to an information technology (IT) department or corporate facilities such that they can manage the resources accordingly. For example, the IT department can address the connectivity issues, or switch parts of the system into a compensatory mode when users are in a location that is associated with poor connectivity. One way of determining that a subject location has poor QoS is by determining that a percentage of users move from the subject location to another location that has a better QoS designation.

The value of the threshold for the number of devices discussed in the above example scenarios can either be predetermined (e.g., hard-coded) or can be determined dynamically (e.g., programmed via software). The dynamic nature of the designations can be used in allocating resources (e.g., allocating telephony resources 250) as described in detail below.

FIG. 3*b* is a block diagram illustrating a machine learning model for generating the contextual spatial models of FIG. 2, according to an example embodiment. A machine learning model deals with a study of systems that can learn from data they are operating on, rather than follow only explicitly programmed instructions like in a rules-based model. For a subject location, the machine learning model receives contextual information 310 associated with the subject location and generates a designation or tag 350 based on likelihoods generated by a plurality of machine learning models 330*a-n* and selection rules 340. In an example embodiment, the process of receiving contextual information and generating a designation is repeated for each unique subject location of a premises such that a complete contextual spatial model of the premises can be generated. Alternatively, the process of receiving contextual information and generating a designation is repeated for a subset of all unique subject locations of the premises.

Machine learning can be implemented using supervised learning, where the model is presented with a data set of example contextual information inputs and their desired outputs such that model can develop a general rule that can map any input to an output. The process of supervised learning can be implemented for a plurality of machine learning models 330*a-n*, where each model can be associated with each unique subject location of a premises. For example, machine learning model1 330*a* predicts a likelihood that a location is a conference room, machine learning model2 330*b* predicts a likelihood that a location is a kitchen or lunchroom, and machine learning modelN 330*n* predicts a likelihood that a location is a fax or printer.

After machine learning models are trained with training data sets, each of the models can be presented with contextual information 310 associated with a subject location. In response, each machine learning model outputs a likelihood that the subject location is a location with a designation associated with that particular machine learning model. For example, model1 330a outputs a likelihood L1 that the subject location is a conference room, model2 330b outputs a likelihood L2 that the subject location is kitchen/lunchroom, and modelN 330n outputs a likelihood Ln that the subject location is fax/printer area.

The machine learning model can then use a selection rules module 340 that analyzes the outputted likelihoods L1:Ln to generate a designation/tag 350 for the subject location. An example selection rule is to select the designation associated with the machine learning model that generated the highest likelihood at the current time for a given subject location. For example, if L1=0.8, L2=0.6, and L3=0.2, the selection rules module 340 would select the designation associated with model1 330a and generate a designation "conference room" for the subject location. Another example selection rule can be to select a designation associated with the machine learning model that generated the highest likelihood over a period of time (e.g., the last 24 hours) for a given subject location.

Referring back to FIG. 2, the system determines 230 a designation for the subject location based on the selected location model and by analyzing the location information and contextual information received from the plurality of devices. In an example embodiment, receiving location information 210 and receiving contextual information 220 is iterated 245 for each device of the plurality of devices until the location model has sufficient data to generate designations that accurately represent the premises. An example advantage with crowdsourcing is that as the number of devices from which location and contextual information are received increases, an accuracy of a prediction by the location model also increases.

The designations generated by the location model for each subject location of the premises is then stored on a contextual spatial model 240 of the premises. As the system continues to receive data from a plurality of devices associated with the premises, more designations are created and stored on the contextual spatial model. After a sufficient number of designations are generated and stored over a period of time, the system generates 240 a contextual spatial model (i.e., spatial map) for the premises. An example spatial map 400 for a typical office premises is illustrated in FIG. 4. Contextual spatial model 400 shows lobby 410; conference rooms 420, 422, and 424; kitchen/lunchroom 430, printer/fax 440; restrooms 450; and cubicles 460. An example spatial map can include additional information such as a name of an employee working in a particular "cubicle zone" of an office that can complement the designation of the subject location. This is particularly helpful for big organizations that have offices premises that have a large number of employees working in a particular "cubicle zone." Moreover, the system can add supplemental information including an employee's role within the organization and their stature (e.g., CEO) to the name of the employee in the spatial map. The system can further manage the resources by changing a priority for allocating resources based on the designation of employees scheduled to utilize those resources. For example, if it is determined that one of the participants in a scheduled event taking place at a conference room is the CEO (or a member of board of directors), the system can prioritize allocating resources to the meeting involving the CEO over other meetings that do not involve other C-level executives.

Additionally, it is also advantageous to have a name associated with a device on the spatial map for venues that host concerts or games. For example, when an emergency (i.e., fire, earthquake, tornado, and the like) takes place at a venue while hosting a sporting event, a spatial map with names included with a subject location is helpful to identify users associated with the designated subject location.

Once a contextual spatial model is created for the premises, the contextual spatial model can be used for a number of functions, including allocating resources for the premises. For example, the contextual spatial map can indicate a location of various resources deployed for the premises as depicted by the location of WiFi™ routers 470 in FIG. 4. The created contextual spatial models can illustrate thematic indoor maps of premises showing usage, distribution, and/or availability of telephone resources and/or a demand therefor. For example, based on the observed pattern of user movements during the day, the system can determine locations of the "hot zones" of the premises that consume higher telephony resources (e.g., conference rooms during peak meeting hours) and allocate telephony resources 250 accordingly.

In an example embodiment, telephone resources are allocated 250 for the premises based on the generated designations of the contextual spatial model. For example, more telephony resources can be allocated for a subject location designated as a conference room compared to a subject location designated as lobby. In another example scenario, a first conference room that is designated as a "hot zone" is allocated with more telephony resources (i.e., augmented resources) relating to audio/video conferencing compared to a second conference room that is not designated as a "hot zone."

Additionally, telephone resources can be allocated ahead of the scheduled time of the event after a correlation between a subject location of the scheduled event and an actual location of the premises has been learned by the system. From that point on, the system can dynamically allocate resources by receiving contextual formation such as from the calendaring system and be prepared ahead of time to allocate resources for upcoming meetings that are known to occur at the known location. Furthermore, the system can use information from the calendaring system, such as the number of attendees expected at the scheduled meeting, to better prepare for the expected communications load. Moreover, the system can make judgments on a QoS that should be ensured for the subject location during the time of specific meetings, based upon an understanding of the importance of a meeting or its participants, such as executive officers of a company, board members, potential investors, or business partners.

Alternatively or additionally, when a determination is made that the first conference room is "not in use" the telephony resources allocation can be reduced and those resources can be deployed to another portion of the premises which might need such resources. Accordingly, monitoring user's device movements can create dynamic contextual spatial models that can be used to deploy and change an allocation of telephony resources in real-time based on a current demand.

The system can also record and store supplemental meta data associated with particular locations of the premises. For example, there can be certain locations that are associated with poor QoS communications at a certain time period of the day. The lower QoS can be as a result of an increased demand for communication services for that location (e.g., conference call with a larger number of participants) for the particular time period. Additionally, the lower QoS can be because of ambient conditions of the location. For example, if an ambient noise level is higher at the location, the QoS can take a hit. Accordingly, the designations of the spatial maps can be supplemented with meta data about QoS of the subject locations.

The system can, upon learning of the poor QoS for a location, take remedial steps to improve QoS for the location. For example, if the system determines that the demand exceeds the available bandwidth for the communication, the system can increase the available bandwidth to meet the demand in a real-time basis. Alternatively if the QoS is poor due to high ambient noise due to a malfunctioning air conditioning system, for example, the system can send a notification to the IT department or facilities personnel (or can modify the settings of the AC system itself, if possible) to repair the AC system, to install audio damping equipment, or the like.

In an example embodiment, the system can determine one or more subject locations of the premises with high usage of communications resources and time periods associated with the high usage. The system can further determine that high usage by detecting a percentage of the plurality of devices at the subject location. For example, if more than 50% of all known devices associated with a premises are detected at a subject location of the premises, the system determines that the specific subject location is in high usage at that specific time. The system can not only add the high usage and time period information on the spatial map of the premises but also use this information to manage resources accordingly.

In another example embodiment, the created contextual spatial model can be used to allocate WiFi bandwidth in a public stadium. Based on monitoring user's devices and their corresponding contextual information, the system can create a dynamic thematic contextual spatial model showing usage, distribution, or availability of WiFi bandwidth in the stadium. Based on the dynamic demand, the system can allocate the WiFi bandwidth appropriately, by augmenting allocation of bandwidth for areas of higher demand and reducing for areas of lower demand. For example, WiFi bandwidth for subject locations of a stadium that are sparsely populated when a game in the stadium does not sell out can be reduced. In the same example scenario, if some people in the audience decide to move seats such that a subject location of the stadium is almost full, the system can dynamically identify the increase in demand for bandwidth at the subject location and increase the allocation to meet the new demand.

In an example embodiment, the system can add supplemental data to the designations of the locations that are based in analyzing biometric information associated with users at that particular location. For example, biometric sensors such as a heart rate monitor of a device can provide heart rate information of its user to the system when the user is at a particular location. By analyzing the received heart rate data (i.e., contextual information) of a plurality of users at a specific location, the system can qualify the location designation with heart rate data typically associated with the users of the location. If, for example, the average heart rate of users at the location is much higher than at other locations of the premises, the system can not only add that information to the designation but can also take remedial steps, if possible. For example, if the system detects that an ambient temperature associated with the location is higher than an expected range of temperatures, the system, can modify the settings of the AC system (or send a notification to the appropriate facilities personnel) of the location to reduce the ambient temperature.

Each of the above identified instructions and applications can correspond to a set of instructions for performing one or more functions described above. These instructions need not be implemented as separate software programs, procedures, or modules. The memory module of a device of the plurality of devices 110a-n can include additional instructions or fewer instructions. It is understood that a module can be implemented in hardware, or software, or a combination of hardware and software. Furthermore, various functions of the mobile device can be implemented in hardware and/or in software, including in one or more signal processing and/or application specific integrated circuits.

The disclosure of the example embodiments is intended to be illustrative, but not limiting. Persons skilled in the relevant art can appreciate that many modifications and variations to the foregoing example embodiments are possible in light of the above disclosure.

What is claimed is:

1. A computer-implemented method comprising:
receiving position information describing a position of each respective device of a plurality of devices; receiving contextual information items that are associated with the positions of the plurality of devices, the received contextual information items related to usage of each of the plurality of devices;
determining, for a subject location within a premises, a usage pattern of the plurality of devices when the plurality of devices are at the subject location, the usage pattern determined based on the received contextual information items of the plurality of devices and describes usage of telephony or data services via a device;
determining, at a server, a label for the subject location for the subject location based on:
the determined usage pattern of the plurality of devices,
applying one or more contextual information items of the contextual information items to each of a plurality of machine learning models that are each associated with different subject locations and at least one of the plurality of machine learning models is associated with the subject location, and each of the plurality of machine learning models output respective likelihoods that their respective subject locations are associated with the determined label,
selecting the subject location associated with the highest likelihood, and
determining the label for the subject location based on the selecting; and
storing the label for the subject location in a memory.

2. The computer-implemented method of claim 1, further comprising:
generating a spatial map for the premises, the spatial map including labels determined for a plurality of subject locations within the premises.

3. The computer-implemented method of claim 2, further comprising:
determining one or more subject locations of the premises with high usage and time periods associated with the high usage, the high usage further determined by whether a percentage of the plurality of devices are detected at the subject location.

4. The computer-implemented method of claim 2, wherein the determined labels of the spatial map include a name of a user associated with a device of the plurality of devices at a subject location of the plurality of locations of the premises.

5. The computer-implemented method of claim 4, further comprising:

identifying one or more users of a subject location within the premises based on the names associated with the determined labels of the premises.

6. The computer-implemented method of claim 1, wherein determining the label for the subject location is further based on applying the obtained contextual information items to a location model to obtain the label for the subject location, the location model for determining the label for the subject location is implemented by a rules engine comprising one or more rules.

7. The computer-implemented method of claim 6, wherein the one or more rules of the rules engine include at least one of:
whether a percentage of the plurality of devices are detected at the subject location within a time period of the plurality of devices receiving a notification of the contextual information items associated with the subject location,
whether a percentage of the plurality of devices are detected at the subject location within a time period of a scheduled event,
whether device settings are changed for a percentage of the plurality of devices at the subject location, the changes in device settings include at least one of:
changing mobile phone ringtone to vibrate, changing incoming call handling rules to direct calls to voice-mail directly, and sending an auto-reply message in response to incoming calls or messages, and
whether a percentage of the plurality of devices is engaged in predominantly work-related communication or engaged in predominantly personal communication.

8. The computer-implemented method of claim 1 further comprising:
storing the label in connection with the subject location on a map of the premises.

9. The computer-implemented method of claim 1 further comprising:
allocating telephony resources for the subject location based on the determined label.

10. The computer-implemented method of claim 9, wherein allocating telephony resources for the subject location includes augmenting or reducing telephone resources.

11. The computer-implemented method of claim 1, wherein the contextual information items are associated with at least one of: calendar, phone log, email, fax, and social networking applications of the device.

12. The computer-implemented method of claim 1, wherein the contextual information items are associated with health-related biometric information.

13. The computer-implemented method of claim 12, further comprising:
taking remedial measures for the subject location based on the determined label, the label determined in response to receiving the health-related biometric information.

14. The computer-implemented method of claim 1, wherein the position and contextual information items are received from an endpoint or a server, wherein the server can be at least one of: an email server, fax server, application server, communications server, database server, and a group of remote servers.

15. The computer-implemented method of claim 1 further comprising:
allocating WiFi bandwidth for the subject location based on the determined label, the allocating of WiFi bandwidth for the subject location includes augmenting or reducing bandwidth based on the determined label.

16. The computer-implemented method of claim 1, wherein the contextual information items related to at least one of the device and a user associated with the device are received when the device is at or proximate the position.

17. The computer-implemented method of claim 1, wherein the usage of the device related to the received contextual information items comprises at least one of: using the device in a vibrate or silent mode, placing or receiving calls with the device, running an application on the device, and having the device in standby mode.

18. The computer-implemented method of claim 1, wherein the contextual information items comprise position information of the device's position.

19. A non-transitory computer-readable storage medium, the storage medium storing computer program instructions, executed by a computer processor, the computer program instructions comprising instructions for:
receiving position information describing positions of each device of a plurality of devices;
receiving contextual information items that are associated with the positions of the plurality of devices, the received contextual information items related usage of each of the plurality of devices;
determining, for a subject location within a premises, a usage pattern of the plurality of devices when the plurality of devices are at the subject location, the usage pattern determined based on the received contextual information items of the plurality of devices and describes usage of telephony or data services via a device;
determining, at a server, a label for the subject location for the subject location based on:
the determined usage pattern of the plurality of devices,
applying one or more contextual information items of the contextual information items to each of a plurality of machine learning models that are each associated with different subject locations and at least one of the plurality of machine learning models is associated with the subject location, and each of the plurality of machine learning models output respective likelihoods that their respective subject locations are associated with the determined label,
selecting the subject location associated with the highest likelihood, and
determining the label for the subject location based on the selecting; and
storing the label for the subject location in a memory.

* * * * *

UNITED STATES PATENT AND TRADEMARK OFFICE
CERTIFICATE OF CORRECTION

PATENT NO. : 9,788,168 B2
APPLICATION NO. : 14/985184
DATED : October 10, 2017
INVENTOR(S) : Martin Arastafar, Patrice Khawam and Christopher van Rensburg It is certified that error appears in the above-identified patent and that said Letters Patent is hereby corrected as shown below:

In the Claims

Claim 1, Column no: 12, Line(s) 32-33: "determining, at a server, a label for the subject location for the subject location based on:" to read as -- determining, at a server, a label for the subject location based on: --

Claim 19, Column no: 14, Line(s) 41-42: "determining, at a server, a label for the subject location for the subject location based on:" to read as -- determining, at a server, a label for the subject location based on: --

Signed and Sealed this
Tenth Day of April, 2018

Andrei Iancu
*Director of the United States Patent and Trademark Office*